(12) United States Patent
Ormond

(10) Patent No.: US 10,038,799 B2
(45) Date of Patent: Jul. 31, 2018

(54) SYSTEM AND METHOD FOR FIELD CUSTOMIZATION OF MULTIFUNCTION PERIPHERALS

(71) Applicants: Kabushiki Kaisha Toshiba, Minato-ku (JP); Toshiba TEC Kabushiki Kaisha, Shinagawa-ku (JP)

(72) Inventor: Louis M. Ormond, Irvine, CA (US)

(73) Assignees: Kabushiki Kaisha Toshiba, Minato-ku (JP); Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 15/893,449

(22) Filed: Feb. 9, 2018

(65) Prior Publication Data

US 2018/0183953 A1 Jun. 28, 2018

Related U.S. Application Data

(63) Continuation-in-part of application No. 15/455,348, filed on Mar. 10, 2017, now Pat. No. 9,912,826.

(60) Provisional application No. 62/334,634, filed on May 11, 2016, provisional application No. 62/491,553, filed on Apr. 28, 2017.

(51) Int. Cl.
*H04N 1/00* (2006.01)
*H04N 1/32* (2006.01)

(52) U.S. Cl.
CPC ....... *H04N 1/00411* (2013.01); *H04N 1/0097* (2013.01); *H04N 1/00424* (2013.01); *H04N 1/00506* (2013.01); *H04N 1/32122* (2013.01); *H04N 2201/0094* (2013.01); *H04N 2201/3211* (2013.01)

(58) Field of Classification Search
CPC ............. H04N 1/0097; H04N 1/32122; H04N 1/00411; H04N 1/00424; H04N 1/00506; H04N 2201/3211; H04N 2201/0094
USPC ........................................................ 358/1.15
See application file for complete search history.

(56) References Cited

U.S. PATENT DOCUMENTS

| | | | |
|---|---|---|---|
| 2003/0067488 A1* | 4/2003 | Rudd | G06F 3/0481 715/765 |
| 2004/0212823 A1* | 10/2004 | Chavers | H04N 1/00411 358/1.15 |
| 2007/0103723 A1* | 5/2007 | Wolcott | G06Q 30/06 358/1.15 |

\* cited by examiner

*Primary Examiner* — Allen H Nguyen
(74) *Attorney, Agent, or Firm* — Ulmer & Berne LLP

(57) ABSTRACT

A system and method for customized multifunction peripherals includes a controller having a processor and a memory that stores identified electronic customization groups each including electronic files, such as forms, applications, screen backgrounds, company logos, screen positioning information, and labels corresponding to a unique business type. Further stored in the memory are device customization data sets corresponding to document processing operations for the multifunction peripheral. The processor generates indicia on the display identifying each customization group by business type and receives a user selection of a selected identified customization group selected from the indicia. The processor generates, on the display, a customizations menu listing available customizations associated with a user's identity from the selected identified customization group. The processor generates, on the display, a document processing options menu including document processing options corresponding to a portion of the device customization data sets associated with the selected identified customization group.

20 Claims, 11 Drawing Sheets

TopAccess

| Device | Job Status | Logs | Registration | Counter | User Management | | e-Filing |
|---|---|---|---|---|---|---|---|
| | | | | | | | Logout |
| Setup | Security | Maintenance | Registration | AirPrint | | Administration | |

Application
Application List | Settings — 432, 434

Copy App — 428
[Save] [Cancel]

☑ Automatically Send Application Diagnostic Data
Allow the application to send diagnostic information to Toshiba Registration cloud server improves the quality of apps
The diagnostic data does not contain personally identifiable information Scan Quality ☐ Show options to the user — 404
Page Scanning ☐ Show options to the user — 416
⦿ 200 DPI
○ 300 DPI
○ 400 DPI
☐ Scan both sides of pages
☐ Remove Blank Pages Color Mode ☐ Show options to the user — 408
Finishing ☐ Show options to the user — 420
⦿ Color
○ Gray Scale
○ Black Only
☐ Staple
☐ Hole Punch File Type ☐ Show options to the user — 412
⦿ PDF
○ TIFF
○ JPG Scan Confirmation — 424
☑ Print Confirmation Receipt
Send Confirmation E-mail to
☐ Logged in User
☐ Other E-mail Addresses
[Enter up to 5 comma separated e-mail addresses]

Install Software | | Top | Help | ©2016 TOSHIBA TEC CORPORATION All Rights Reserved.

| TopAccess | | | | | | | e-Filing |
| --- | --- | --- | --- | --- | --- | --- | --- |
| | | | | | | | Logout |

| Device | Job Status | Logs | Registration | Counter | User Management | Administration |
| --- | --- | --- | --- | --- | --- | --- |
| Setup | Security | Maintenance | Registration | AirPrint | Application | |

Application
Application List | Settings ← 504

| | Application Name | Version | Manual Operation | Start Type | |
| --- | --- | --- | --- | --- | --- |
| | Copy App | 1.0.0 | | | Uninstall |
| | eConnect Vertical | 2.6.2 | | | Uninstall |
| | e-BRIDGE Plus for Google Drive ™ | 0.5.4 | | | Uninstall |
| | e-Bridge Plus for Dropbox | 0.5.5 | | | Uninstall |
| | e-BRIDGE Plus for OneDrive ® | 1.1.2 | | | Uninstall |
| | BG with Setting_Dis V1.0.0 | 1.0.0 | Start \| Stop | Auto \| Manual | Uninstall |
| | App Shop | 1.0.0 | Start \| Stop | Auto \| Manual | Uninstall |
| | Meter Collection | 1.3.1 | | | Uninstall |
| | eConnect for Box | 1.3.6 | | | Uninstall |
| | Elevate | 2.6.2 | | | Uninstall |
| | QR Discovery | 1.0 | | | Uninstall |
| | Omikuji | 1.0 | | | Uninstall |
| | StackSend | 1.0.0 | | | Uninstall |
| | 308_home_with_setting_1.1.0 | 1.0.0 | | | Uninstall |
| | Secure PDF | 1.0.0 | | | Uninstall |

| Top | Help |

| Install Software |

©2016 TOSHIBA TEC CORPORATION All Rights Reserved.

SYSTEM AND METHOD FOR FIELD CUSTOMIZATION OF MULTIFUNCTION PERIPHERALS

CROSS-REFERENCE TO RELATED APPLICATIONS

This application claims priority to U.S. patent application Ser. No. 15/455,348 filed Mar. 10, 2017 which claims the benefit of U.S. Provisional Application No. 62/334,634, filed May 11, 2016, both of which are incorporated herein by reference.

TECHNICAL FIELD

This application relates generally to customization of multifunction peripherals. The application relates more particularly to field or end user customization of multifunction peripherals to specific needs or constraints of different businesses.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFP means any of the forgoing.

MFPs are typically provided with a fixed set of functions that are available to device end users. In addition to printing, copying, scanning and e-mailing, the device may add further options. Copying or printing may involve hole punching or stapling. Printing may be in black and white, or in color. Scanning may be to an image file or to a text-inclusive file via optical character recognition. These, and other options, are typically selectable by device users via a user interface, such as a touchscreen display integrated into an MFP.

SUMMARY

In accordance with an example embodiment of the subject application, a system and method for customized multifunction peripherals includes a document processing controller including a processor and a memory storing a plurality of identified electronic customization groups wherein each customization group including a plurality of electronic files, such as forms, applications, screen backgrounds, company logos, screen positioning information, labels and the like, and wherein each customization group corresponds to a unique business type. Further stored in the memory are device customization data sets, each data set corresponding to document processing operations in the multifunction peripheral. Included is a scanner, a print operational by instructions issued from the controller, a scanner engine operational by instructions issued from the controller, a user input and a display. The processor generates indicia on the display identifying each of the plurality of customization groups by business type and receives user selection data corresponding to a selected identified customization group selected from the indicia. The processor generates, on the display, a customizations menu listing available customizations associated with a user's identity from the selected identified customization group. The processor generates, on the display, a document processing options menu including document processing options corresponding to a portion of the device customization data sets associated with the selected identified customization group.

BRIEF DESCRIPTION OF THE DRAWINGS

Various embodiments will become better understood with regard to the following description, appended claims and accompanying drawings wherein:

FIG. 4 is a screenshot of an example embodiment for administrative customization of applications;

FIG. 5 is a screenshot of an example embodiment for administrative customization of applications;

FIG. 6 is a screenshot of an example embodiment for administrative customization;

FIG. 10 is an example embodiment of a customization interface; and

DETAILED DESCRIPTION

Figure 1:
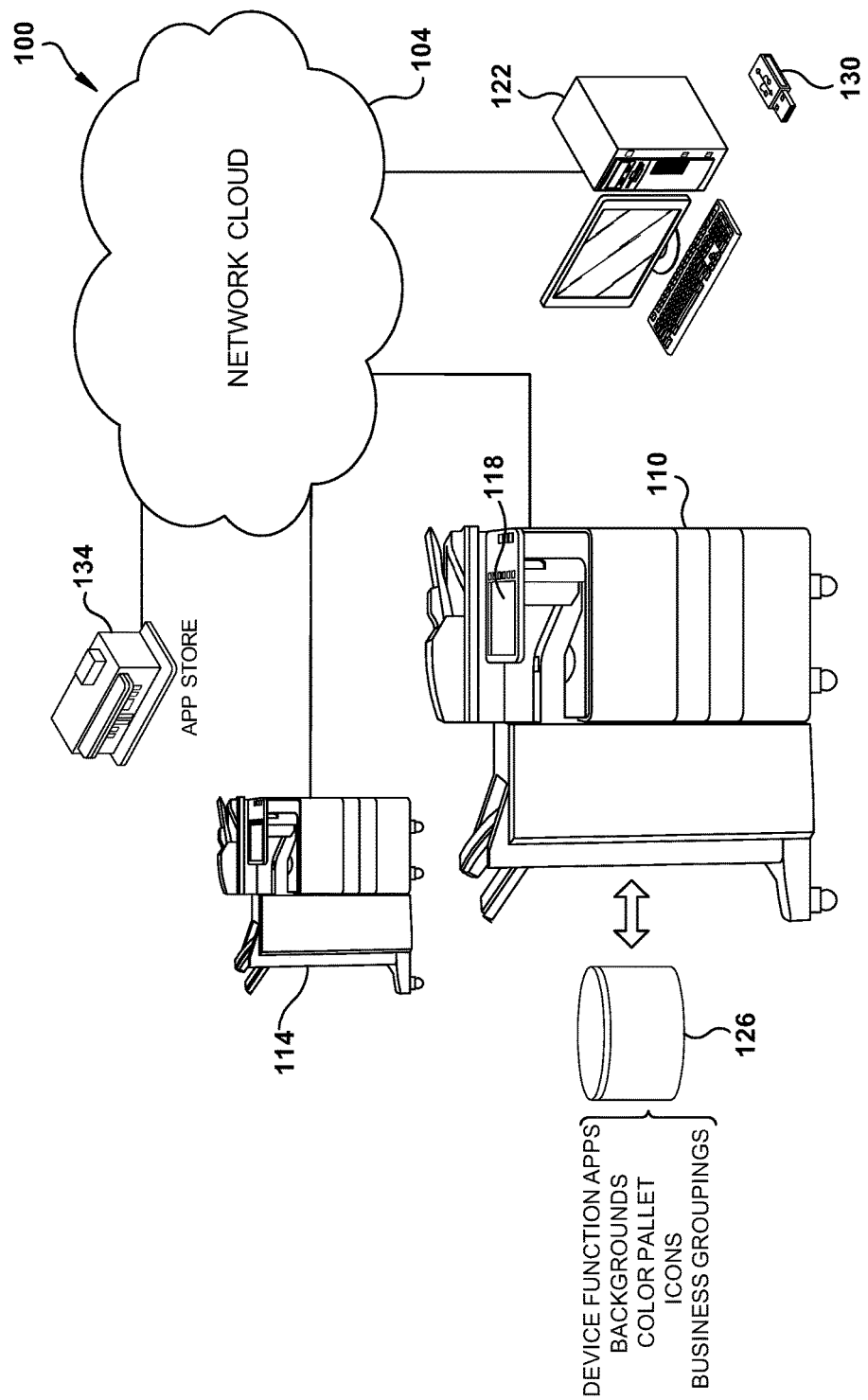
FIG. 1 an example embodiment of an MFP network.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

MFPs are increasingly powerful and capable devices. With such increases comes increasing complexity of device-user interaction. There may be a substantial number of menus generated on the MFP display which may be hierarchical with many possible layers. Users must learn to navigate these menus and controls. A typical MFP user interface design will have most frequently used functions at a top, or high level menu. Less popular device functions can be difficult to find, as well as time consuming to locate. Some users are required to navigate complex menu structures to access less popular functions that they use frequently.

Certain businesses may have particular and frequent need for certain MFP functions which are not needed by other businesses. In these situations, device users may be frequently required to spend considerable time at an MFP user interface to complete their document processing tasks. In businesses with devices that differ from one another, there may be different steps that need to be taken with one device than those required to taken to complete the same job on another device available to them.

In addition to the forgoing, various businesses often have a set of forms that they use regularly. By way of example, an auto dealership may have forms for vehicle sale, vehicle lease, vehicle rental or vehicle purchase. They may also have forms for credit applications, license plate orders, insurance information, etc. An auto salesperson may have their own forms folder and grab a master of a needed form for photocopying for a customer. This requires additional steps for the salesperson. It also provides room for error or inconsistencies since one salesperson may have a different or outdated version of a form in their forms folder. Additionally, certain forms may need to be completed in duplicate, requiring two copies requiring the salesperson to recall that or make a trip back to the MFP. In addition, certain customer data may be sensitive, and even subject to privacy protection under the law, such as personal information that may appear in a credit application.

Other professions will have their own MFP device needs that are markedly different than those of other businesses. The legal profession, for example, may need forms for subpoenas, complaints, proof-of-service and invoices. The medical profession may need forms for patient consent, writing of prescriptions, patient information questionnaires or patient insurance information. The legal profession and the medical profession provide examples of businesses that need to maintain very high levels of confidentiality. Failure to do so may comprise a lawyer's attorney-client privilege. Failure to do so in the medical profession may result in a violation of confidentiality requirements of the U.S. Federal Health Information Portability and Accountability Act (HIPAA), leaving a potential for criminal or civil liability for breaches. Use of improper or outdated forms can result in losses in legal proceedings or patient harm in medical situations. Of course, these can also result in malpractice litigation.

Example embodiments herein provide a system and method for customization of MFPs by end users or system administrators. Functions specific to a particular business can customized to be more readily accessible on MFP interfaces which may be on a user interface of a device itself, communicated by a networked device via a web interface, or built in whole or in part within a driver, such as a printer driver, that is called on a user device. Certain functions may be made unavailable to device users, such as color printing or color copying to avoid toner or ink expenses. By way of further example, an administrator may also implement mandatory device functions, such as by automatically encrypting all e-mails. The administrator may also provide for a customized interface with the company color scheme and company logo. The administrator may also tailor menu hierarchy to have functions of specific or frequent needs placed in a more readily accessible location. As a further benefit, the MFP stores electronic documents, such as forms or templates, for uniform use by employees. In addition to the forgoing, the subject application includes example embodiments wherein a business obtains an MFP device with pre-stored libraries of forms, controls, menus or the like, which are generically in use by other businesses of the same type.

By way of example, the MFP suitably arrives to a business pre-populated with settings, menus, or electronic documents specific to different businesses. For example, there may be a default administrator setup choice for "Legal Profession," which includes legal forms, legal documents, brief templates and blank time slips. It may also include address information for various courts or governmental agencies. Thus, all or some of the law firm's needs may be set up immediately. The administrator may then add or replace electronic documents, such as by uploading or scanning from paper. They may also add needed device functions not appearing in the standard legal setup. They may also add or modify menu structures, as well as customize colors, fonts, resolution, etc. They may also import their firm logo so that it appears on the user interface. This is suitably done via a portable data device, such as USB drive, CD or DVD, via a network connection or by scanning a paper document bearing the logo. The administrator may also export and replicate this interface on other MFP devices in use by the business.

In accordance with the subject application, FIG. 1 illustrates an example embodiment of an MFP network 100 that includes one or more MFPs, illustrated by MFPs 110 and 114. Network 104 is suitably comprised of a local area network (LAN) or a wide area network (WAN) which may comprise the global Internet, or any suitable combination thereof. A system administrator or other user can access MFP control via any suitable user interface, such as an integrated user interface 118 or remotely, such as via workstation 122. While workstation 122 is illustrated as a wired computer, it will be appreciated that any suitable data device, including smartphones, tables, notebook computers, or the like, with network connections that are wireless or wired, may be used. Remote device interfacing is suitably done by accessing an MFP via a network address, such as an internet protocol or IP address. Access may be directly through a web interface, and may include tools such as TOPACCESS from Toshiba America Business Solutions, Inc.

MFP 110 is provided with data storage 126 for electronically storing data corresponding to available device function applications, display backgrounds, color pallets, icons, business groupings, etc.

Additional applications that are available to control MFPs may also be added. They may be physically transported to the MFP via a portable data device such as flash drive 130 or any other suitable data transfer mechanism including Bluetooth, near field communication (NFC), optical, CD, DVD, wireless or wired network, etc. Applications may also be purchased from an application store, such as App Store 134, suitably via network cloud 104.

Figure 2:
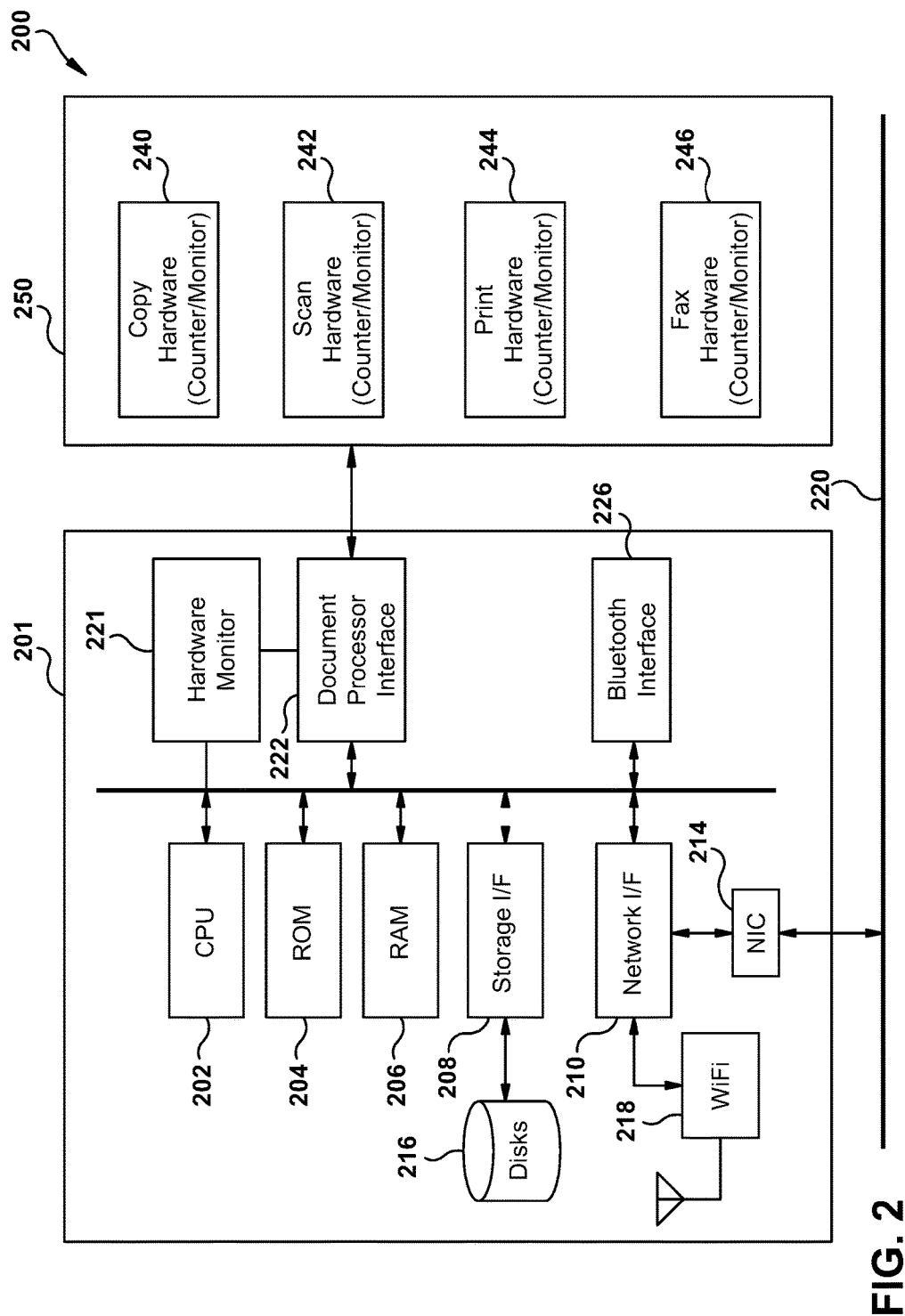
FIG. 2 is an example embodiment of a document rendering system.

Turning now to FIG. 2, illustrated is an example embodiment of a document rendering system 200 suitably comprised within an MFP, such as with MFPs 110 and 114 of FIG. 1. Included is controller 201 comprised of one or more processors, such as that illustrated by processor 202. Each processor is suitably associated with non-volatile memory such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via wireless network interface 218. Example wireless connections include cellular, Wi-Fi, Bluetooth 226, NFC, wireless universal serial bus (wireless USB), satellite, and the like. Example wired interfaces include Ethernet, USB, IEEE 1394 (FireWire), Apple Lightning, telephone line, or the like.

Processor 202 can also be in data communication with any suitable user input/output (I/O) interface which provides data communication with user peripherals, such as displays, keyboards, mice, track balls, touch screens, or the like. Hardware monitor 221 suitably provides device event data, working in concert with suitably monitoring systems. By way of further example, monitoring systems may include page counters, sensor output, such as consumable level sensors, temperature sensors, power quality sensors, device error sensors, door open sensors, and the like. Data is suitably stored in one or more device logs, such as in storage 216.

Also in data communication with data bus 212 is a document processor interface 222 suitable for data communication with MFP functional units. In the illustrated example, these units include copy hardware 240, scan hardware 242, print hardware 244 and fax hardware 246 which together comprise MFP functional hardware 250. It will be understood that functional units are suitably comprised of intelligent units, including any suitable hardware or software platform.

Figure 3:
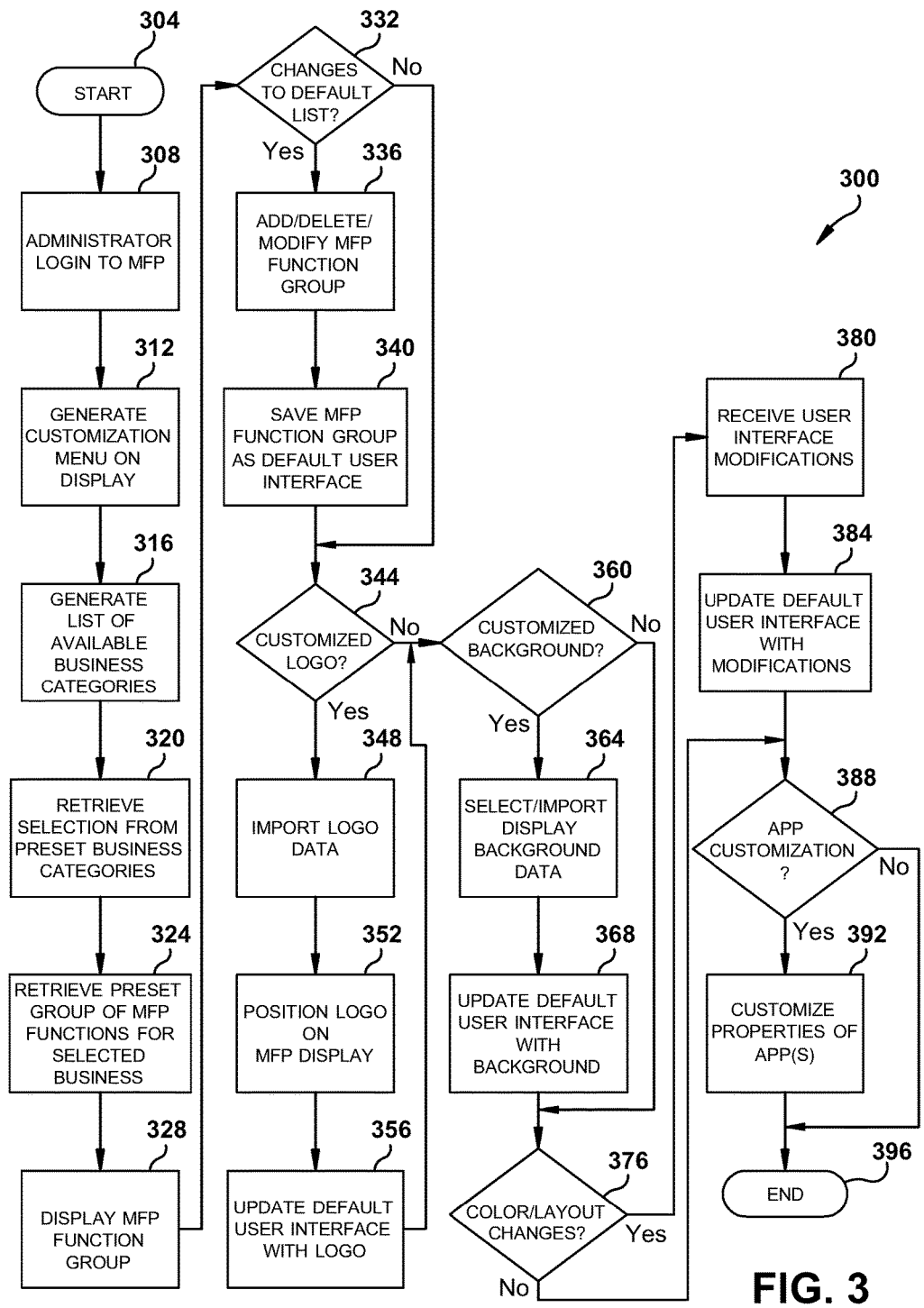
FIG. 3 is a flowchart of an example embodiment for providing a business customizable MFP.

FIG. 3 illustrates a flowchart 300 of an example embodiment for providing a business customizable MFP. The process commences at block 304 and proceeds to block 308 wherein an administrator suitably logs into the MFP, either on the MFP user interface or via a remote terminal. A customization menu is displayed to the administrator at block 312 and a list of available business categories displayed at block 316. The administrator's selection of an available category is received at block 320. Next, a group of preset MFP functions, suitably comprised of applications that can be individually selected or selected in groups, is retrieved from storage at block 324 and displayed to the administrator at block 328. Functions may be retrieved that have been preselected to be associated with a business category or type previously selected by the administrator. If a change is to be made as determined at block 332, then the administrator's changes are made at block 336, saved to the default user interface at block 340, and a check is made at block 344 if a customized logo is to be added for displaying on the MFP user interface. If no changes to the function list are determined at block 332, progress goes directly to the logo change check of block 344.

If the administrator chooses to add a logo at block 344, then logo data is imported into the MFP at block 348 by physical media, wireless connection, wired connection or via a network connection. The administrator positions the logo on a display screen or screens at block 352 and the MFPs default user interface updated accordingly at block 356. A check is then made at block 360 to determine whether a customized background is to be used. Progress to block 360 is direct from block 344 if no customized logo is to be used.

If a customized background is selected at block 360, then it is set at block 364 using either already available options on the MFP or imported background data. The default user interface is updated accordingly at block 368 and then a determination as to whether any changes to the MFP user interface color or layout is made at block 376. Progress is made directly from block 360 to block 376 if no changes to the MFP user interface background are selected.

If color or layout changes are selected in block 376, then the modifications are received at block 380 and the default user interface is stored accordingly at block 384. Next a check as to whether application customization is to be made is completed at block 388. If no color or layout changes were determined at block 376, progress is directly to block 388 for the check for customized applications. If customized applications are to be made, this is accomplished at block 392 and the process ends at block 396. If no application customization is determined at block 388, the process ends thereafter at block 396.

Turning now to FIG. 4, illustrated is a screenshot 400 of an example embodiment for administrative customization of applications. In this example, the administrator can selected a tab such as tab 402 for particular customization areas. In tab 402, one can configure application settings, such as scan quality at 404, color mode at 408, output file type at 412, page scanning at 416 and finishing at 420. The administrator may choose whether a scan confirmation is to be sent at 424. Tabs 428, 432 and 434 provide additional examples of selections for particular customization areas.

FIG. 5 illustrates a screenshot 500 of an example embodiment for administrative customization of applications. In the illustrated example, a list of available applications appears at 504, which applications can be installed/uninstalled or modified.

Figure 6:
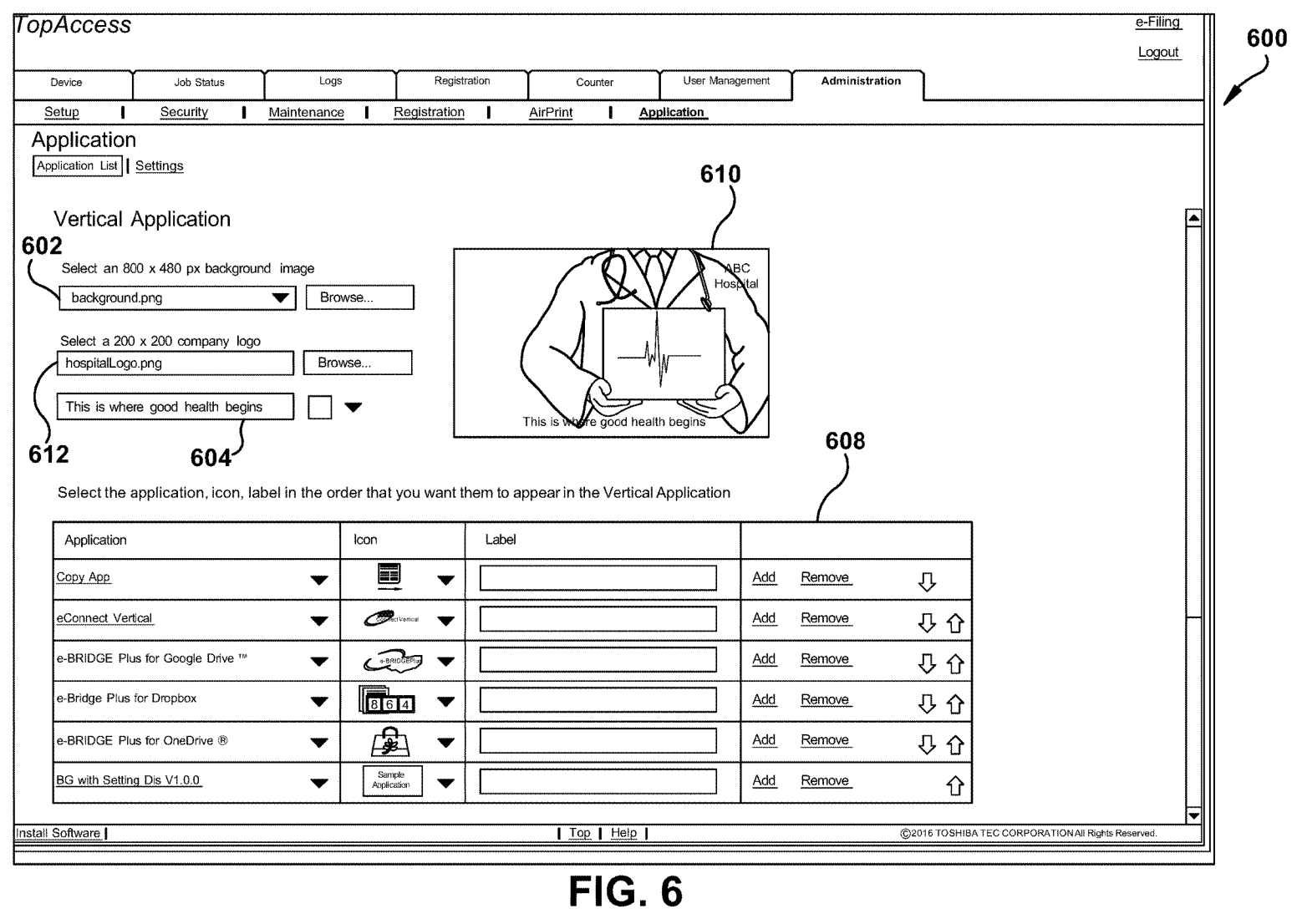

FIG. 6 illustrates a screenshot of an example embodiment for further administrative customization. The vertical application (or UI Customization) is designed to contain one or many installed apps. Additionally, the UI is configurable by the administrator. Possible customizations include the following. Customizations suitably include selects from a set of pre-stored background images or an uploading background image at 602, add a tag line and select a font color at 604, select among the available (installed) applications and change their order or positions of appearance or add an application tag label at 608, or add a company logo at 612. The background image, company logo, and tagline are previewed in a window at 610.

Figure 7:
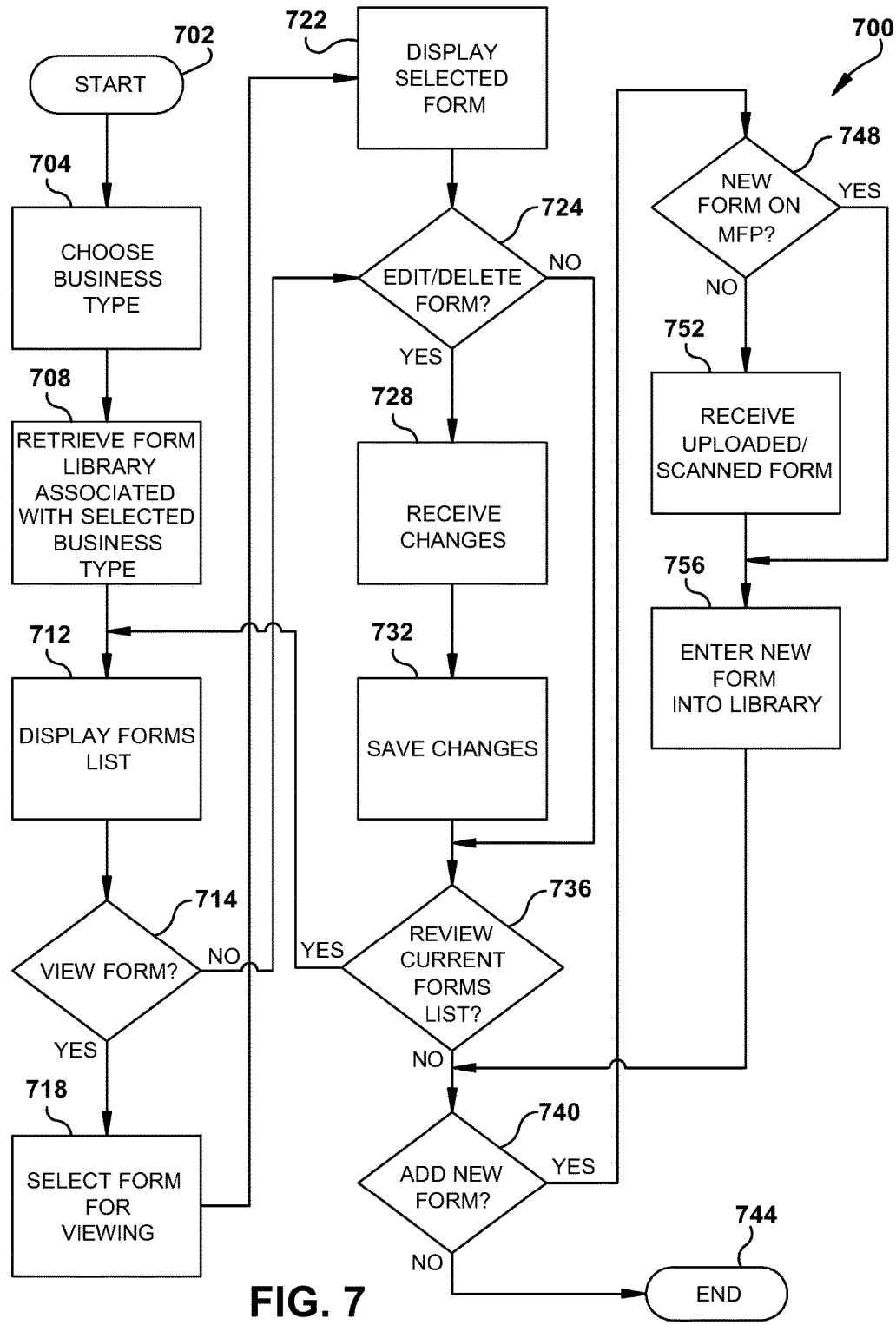
FIG. 7 is a flowchart of an example embodiment of MFP customization relative to available forms.

Referring next to FIG. 7, illustrated is a flowchart 700 of an example embodiment for MFP customization relative to available forms. The process starts at block 702 and proceeds to block 704 wherein a business type is selected from available options by an administrator. A form library associated with a selected business type is retrieved at block 708 and a listing of forms displayed at block 712. The administrator chooses whether to view a form at block 714. If so, the administrator selects a form for viewing at block 718 and display the selected form at block 722. The administrator chooses whether to delete or edit the form at block 724. If no form is selected for viewing at block 714, the process progresses directly to block 724.

If the administrator chooses to edit or delete a form at block 724, changes are received at block 728 and saved at block 732 and the process progresses to block 736. If the administrator did not choose to edit or delete a form at block 724, the process progresses directly to block 736. If the administrator wishes to review the list again at block 736, the process returns to block 712. If not, the administrator chooses whether a new form is desired at block 740. If no new form is needed, the process terminates at block 744. If so, a check is made at block 748 as to whether the new form exists on the MFP, such as a form associated with another business library. If not, the new form is either uploaded digitally or scanned on the MFP scanner at block 752. If the new form is available on the MFP, or if the new form has been uploaded or scanned, the new form is entered into the default library at block 756 and the process returns to block 740 to determine if any other new forms are desired.

Figure 8:
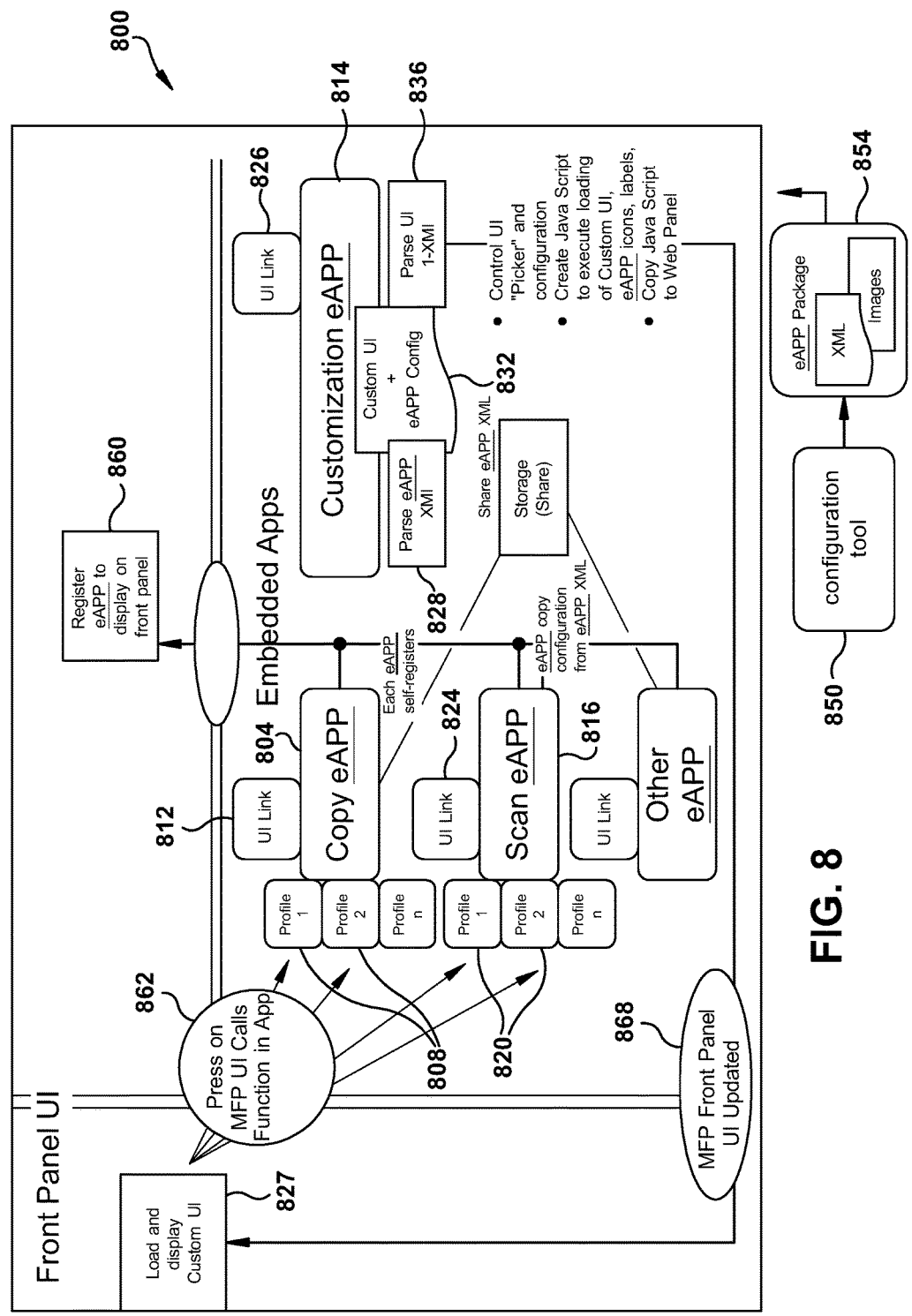
FIG. 8 is an example embodiment of a user interface customization tool.

FIG. 8 illustrates an example embodiment of an administrator or end user MFP user interface customization tool 800 suitably done on an MFP interface, such as an embedded touchscreen. It will be appreciated that, like above, editing may also suitably be done via web client access via a platform such as TOPACCESS. In the example embodiment, end users or administrators may edit or fine tune custom user interfaces, albeit with options that may be more limited than those available to device manufactures. Such imitations are provided to prevent device damage, maintain device or data security, prevent issues with software updating, or assure that disparate functions are not combined or separated. For example, customization permissions may exclude options such as combining double stapling with single stapling or that both color and grayscale printing are selectable simultaneously. Customization options are selectable from embedded electronic applications (eAPPs). Embedded applications in the illustrated example include a copy eAPP 804 functional to control a device copy function with one or more selectable profiles 808. User interface link 812 provides for device interaction. Similarly, scan eAPP 816 includes selectable profiles 820 and a user interface link 824. As a user interface is built, the user can see the results via a rendering of how the configuration would look at 827.

In the example embodiment of FIG. 8, customization is accomplished by callable eAPP, customization eAPP 814. Customization eAPP 814 include an extensible markup language (XML) eAPP parser 828, a custom user interface and eAPP configurator 832, and an XML user interface parser 836. User interface link 826 provides for device interaction. User interaction via a web or device interface is accomplished via configuration tool 850 which calls customization eAPP 814 with an eAPP package 854 providing interaction with XML and image files, such as GIF, TIFF, JPEG or any other suitable image file format. Such image files allow for user placement of images such as company logo's, on a user interface. Customization can also include selection of color schemes, menu layout, background images, available device functions and ordering of nested interface screens. Once a user interface is completed, it is registered and displayed at 860. Updating or patching of eAPPS is suitably done via a user interface selection 862. An updating of the MFP user interface occurs at 868. In accordance with the forgoing, a platform is provided for a local or administrator based user interface to customize an MFP copier look-and-feel by selecting a template layout, adding resident applications to be placed within the template layout, customization of those applications, and customization of the look and feel using a user interface that provides a realistic preview and in-place editing thereby promoting usability and predictability of results.

Figure 9:
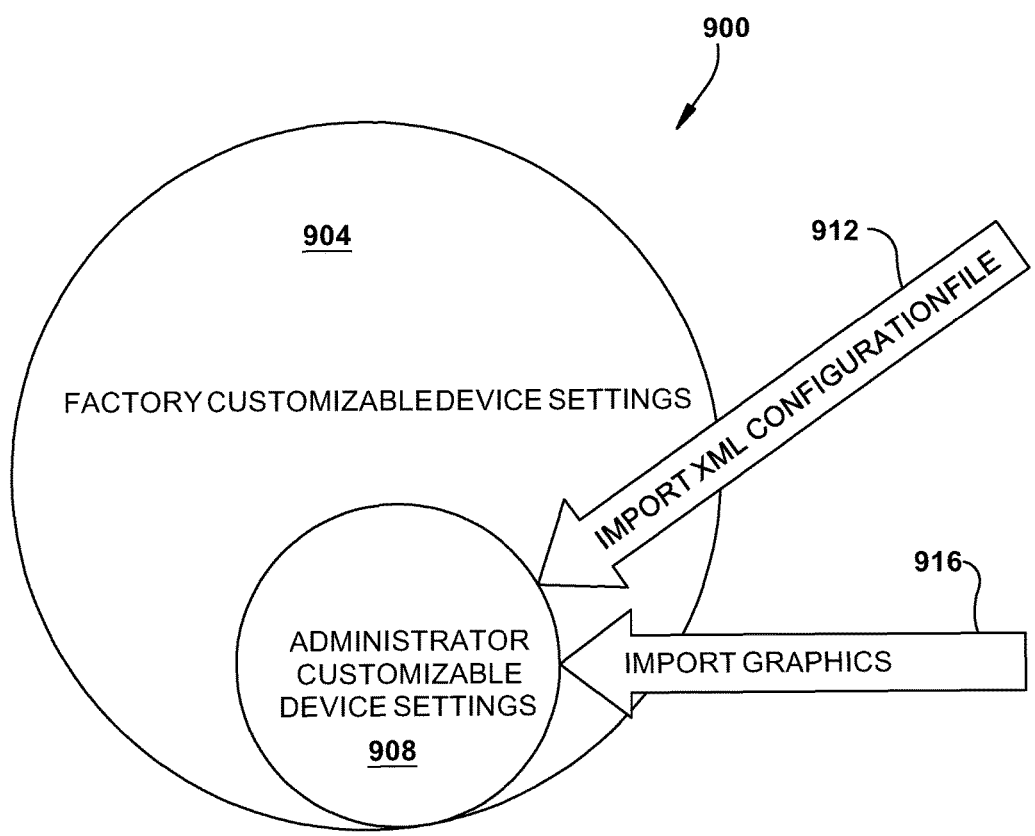
FIG. 9 is an example embodiment of a reduced, second level customization.

FIG. 9 is an example embodiment of a reduced, second level customization 900. In the illustrated example, a set of all possible customizations is illustrated at 904. A subset of available, second tier or administrator customizations is illustrated at 908. Customization options are suitably tied to permissions associated with a user's login credentials, such as a username and password. Multiple levels of available customizations are suitably provided. For example, a site administrator may be provided with more or different customization options than an office manager, accountant or end user. Customizations are also suitably loadable, when corresponding permissions have been enabled, such as via an XML file as illustrated at 912. Permissions may also allow for importation of graphical images for second level or administrative user interface customization as illustrated at 916.

Figure 10:
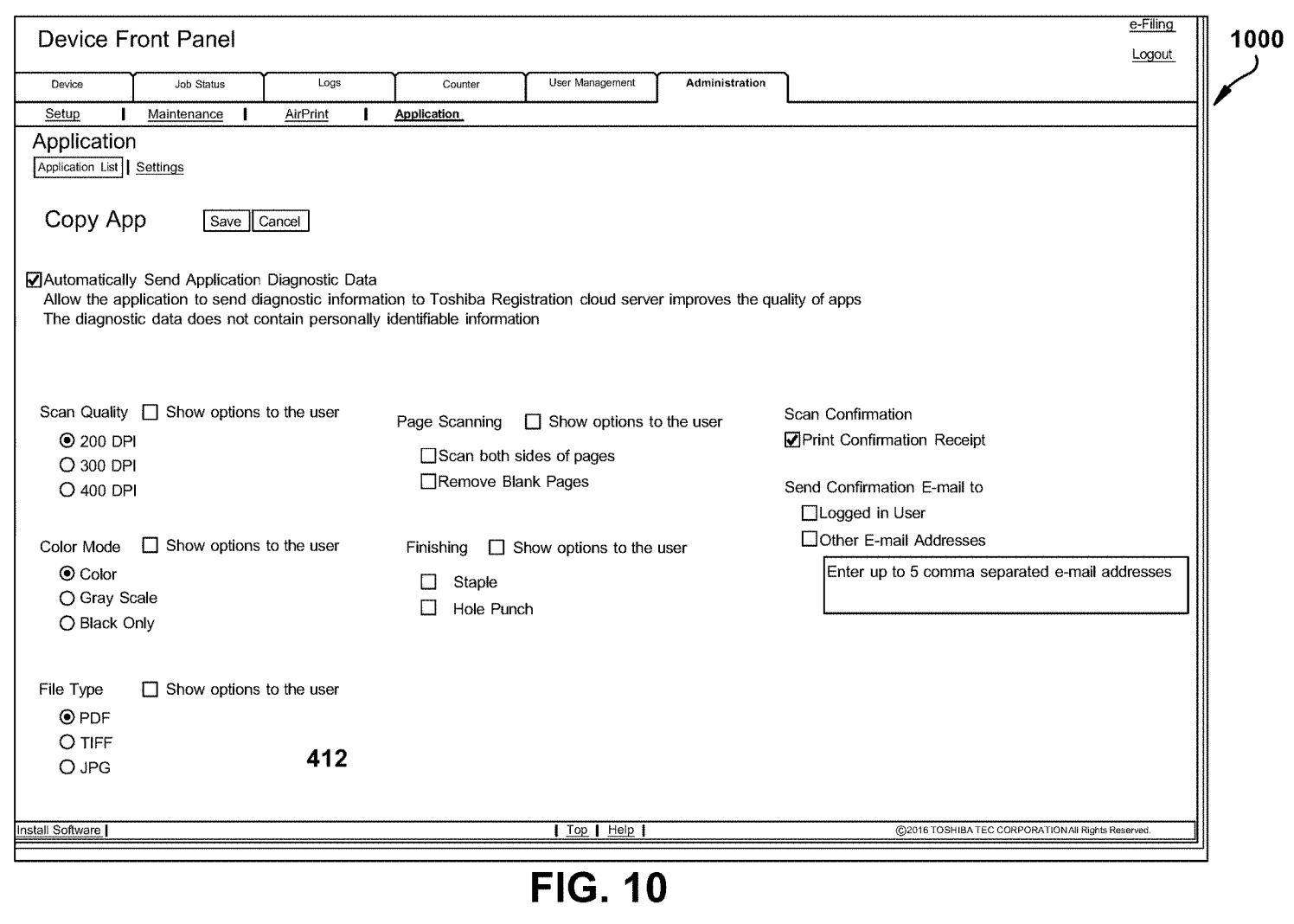

FIG. 10 is an example embodiment of a customization interface 1000 such as may appear on an MFP user interface during second level or administrative device customization. Referring additionally to FIG. 4, it will be seen that certain customization options, namely tabs 428, 432 and 434 of FIG. 4 do not appear in the configuration menus of FIG. 10.

Figure 11:
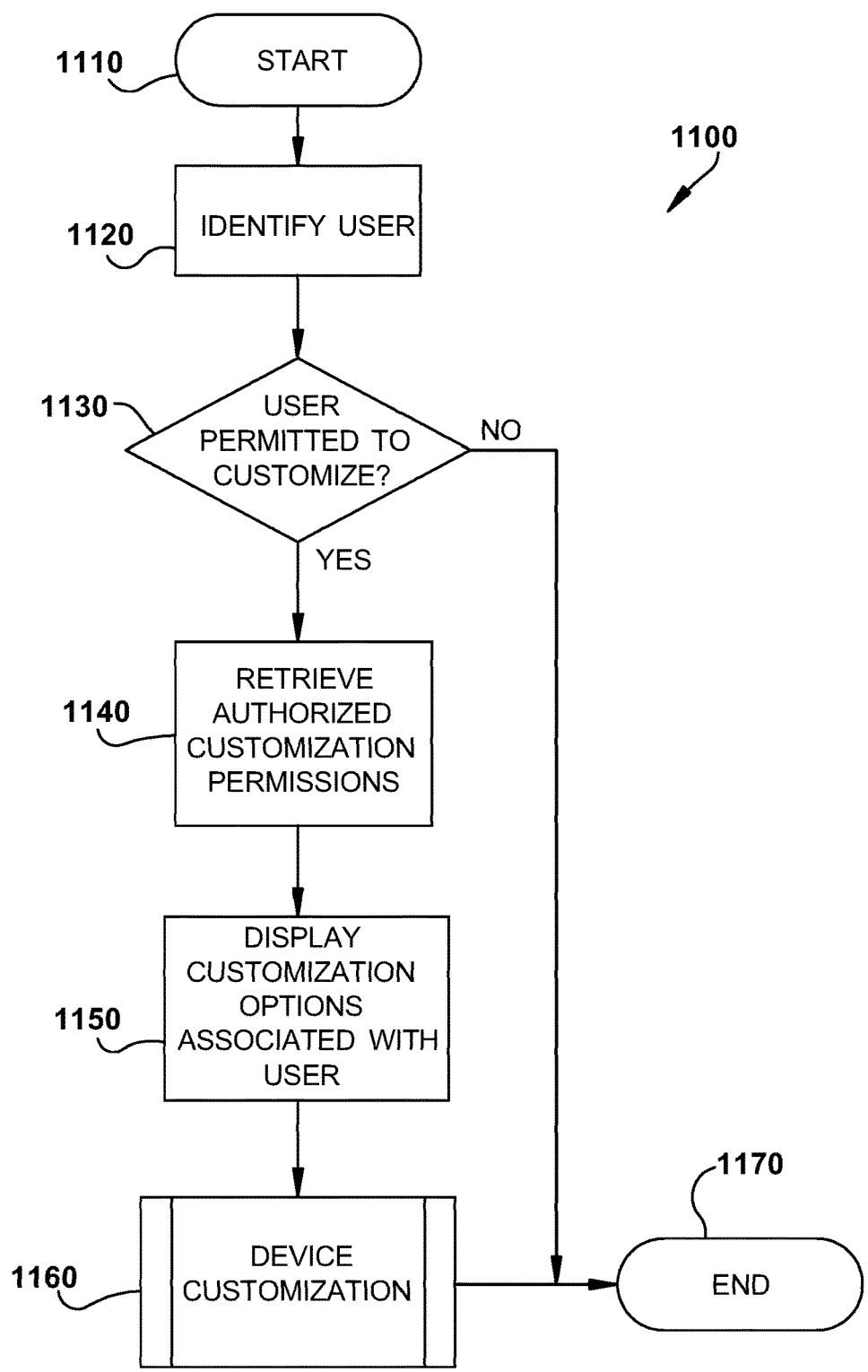
FIG. 11 is an example embodiment of device customization associated with user identity.

FIG. 11 is a flowchart 1100 of an example embodiment of device customization associated with user identity. The process commences at block 1110 and a user is identified at block 1120. A check is made if the identified user has customization authority at block 1130. If so, their authorized customization permissions are retrieved at block 1140 and customization options displayed at block 1150. Customization is undertaken, such as described above, at block 1160. When customization is complete, the process ends at 1170. If the identified user has no authority for device customization as determined at block 1130, the process ends thereafter at block 1170.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A multifunction peripheral comprising:
 a document processing controller including,
  a processor, and
  a memory configured to
   store a plurality of identified electronic customization groups, each customization group including a plurality of electronic files,
   store a plurality of device customization data sets, each data set corresponding to a document processing operation in the multifunction peripheral, and
   store customization permission data identifying a subset of the plurality of electronic customization groups or electronic customization files;
 a print engine operational by instructions issued from the controller;
 a scanner engine operational by instructions issued from the controller;
 a user input; and
 a display,
 wherein the processor is configured to generate indicia on the display identifying the plurality of customization groups by business type,
 wherein the processor is further configured to receive user selection data received via the user input corresponding to a selected identified customization group selected from the indicia,
 wherein the processor is further configured to identify a user,
 wherein the processor is further configured to generate, on the display, a customizations menu listing available customizations from the selected identified customization group corresponding to the subset of electronic customization groups or electronic customization files associated with the user, and
 wherein the processor is further configured to generate, on the display, a document processing options menu including document processing options corresponding to a portion of the device customization data sets associated with the selected identified customization group.

2. The multifunction peripheral of claim 1 further wherein the processor is further configured to edit the customizations menu in accordance with user selection received via the user input.

3. The multifunction peripheral of claim 2 wherein the processor is further configured to edit the customizations menu to include an entry referencing user-supplied customization data.

4. The multifunction peripheral of claim 3 wherein the processor is further configured to receive the user-supplied customization data from the scanner engine.

5. The multifunction peripheral of claim 4 wherein the processor is further configured to edit document processing operation options listed on the document processing options menu in accordance user selection received via the user input.

6. The multifunction peripheral of claim 5 wherein the processor is further configured to generate a company personalization image on the display in accordance with user selection received via the user input.

7. The multifunction peripheral of claim 6 wherein the company personalization data includes logo data corresponding to a business type associated with the selected identified customization group.

8. A method comprising:
   storing, in a memory, a plurality of identified electronic customization groups, each customization group including a plurality of electronic customization documents, and wherein each customization group corresponds to a unique business type;
   storing a plurality of device customization data sets, each data set corresponding to control of a document processing operation of a multifunction peripheral;
   storing customization permission data identifying a subset of the plurality of electronic customization groups or electronic customization files;
   generating, via a processor, indicia on a display identifying the plurality of customization groups by business type;
   receiving user selection data corresponding to a selected identified customization group selected from the indicia;
   identifying a user;
   generating, on the display, a customizations menu listing available customizations from the selected identified customization group corresponding to the subset of electronic customization groups or electronic customization files associated with the user; and
   generating, on the display, a document processing options menu including document processing options corresponding to a portion of the device customization data construction sets associated with the selected identified customization group.

9. The method of claim 8 further comprising editing, via the processor, the customizations menu in accordance with user input.

10. The method of claim 9 further comprising editing the customizations menu to include an entry referencing user-supplied customization data.

11. The method of claim 10 further comprising receiving the user-supplied customization data from a scanner engine of the multifunction peripheral.

12. The method of claim 11 further comprising editing document processing operation options listed on the document processing options menu in accordance a received user selection.

13. The method of claim 12 further comprising generating a company personalization image on the display in accordance with user selection received user selection.

14. The method of claim 13 wherein the company personalization data includes logo data corresponding to a business type associated with the selected identified customization group.

15. A multifunction peripheral comprising:
   a document processing controller including,
      a processor, and
      a memory configured to
         store a plurality of device customization data sets, each data set corresponding to a document processing operation of the multifunction peripheral, and
         store customization permission data identifying a subset of the plurality of device data customization data sets;
   a print engine operational by instructions issued from the controller;
   a scanner engine operational by instructions issued from the controller;
   a user input; and
   a display,
   wherein the processor is configured to generate indicia on the display identifying the subset of the plurality of device customization data sets in accordance with an identity of the user,
   wherein the processor is further configured to generate, on the display, a customizations menu listing available customizations of the subset of device customization data sets,
   wherein the memory is further configured to store at least one user-supplied electronic customization from the customization menu,
   wherein the processor is further configured to update the customizations menu to include reference to the at least one user-supplied electronic customization, and
   wherein the processor is further configured to generate, on the display, a document processing options menu including document processing options corresponding to the user-supplied electronic customization.

16. The multifunction peripheral of claim 15 wherein the scanner engine is configured to generate the at least one user-supplied electronic customization from a scan of a tangible document.

17. The multifunction peripheral of claim 15 wherein the processor is further configured for generating document processing corresponding to a plurality of the device customization data sets in accordance with received user selection.

18. The multifunction peripheral of claim 17 wherein the processor is further configured to export data corresponding to the user-supplied electronic customization to at least a second multifunction peripheral.

19. The multifunction peripheral of claim 18 wherein the processor is further configured to selectively implement a document security protocol for document processing operations when indicated by the selected identified customization group.

20. The multifunction peripheral of claim 18 wherein the selected identified customization group corresponds to a medical profession and wherein the document security protocol includes HIPAA compliance.

* * * * *